(12) United States Patent
Sanduleanu et al.

(10) Patent No.: US 11,096,190 B2
(45) Date of Patent: *Aug. 17, 2021

(54) WIRELESS CROSS-CONNECT SWITCH

(71) Applicant: INTERNATIONAL BUSINESS MACHINES CORPORATION, Armonk, NY (US)

(72) Inventors: Mihai A. Sanduleanu, Abu Dhabi (AE); Laurent Schares, Pleasantville, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/742,072

(22) Filed: Jan. 14, 2020

(65) Prior Publication Data

US 2020/0154455 A1   May 14, 2020

Related U.S. Application Data

(63) Continuation of application No. 15/791,995, filed on Oct. 24, 2017, now Pat. No. 10,602,532, which is a continuation of application No. 14/231,219, filed on Mar. 31, 2014, now Pat. No. 9,854,594.

(51) Int. Cl.
*H04W 72/12* (2009.01)
*H04B 7/08* (2006.01)
(Continued)

(52) U.S. Cl.
CPC ........ *H04W 72/1205* (2013.01); *H04B 7/086* (2013.01); *H04L 47/50* (2013.01);
(Continued)

(58) Field of Classification Search
CPC .. H04W 72/1205; H04W 16/28; H04B 7/086; H04L 49/101; H04L 49/254; H04L 47/50
See application file for complete search history.

(56) References Cited

U.S. PATENT DOCUMENTS 5,604,735 A    2/1997  Levinson et al.
5,821,908 A    10/1998 Sreenivas
(Continued)

FOREIGN PATENT DOCUMENTS

JP   H03220475 A    9/1991
WO   2006055784     5/2006
WO   2011044288 A2  4/2011

OTHER PUBLICATIONS

List of IBM Patents or Patent Applications Treated as Related dated Jan. 14, 2020, 2 pages.

(Continued)

*Primary Examiner* — Sai Aung
*Assistant Examiner* — Wilfred Thomas
(74) *Attorney, Agent, or Firm* — Tutunjian & Bitetto, P.C.; Jeffrey S. LaBaw

(57) ABSTRACT

Methods and systems for wireless packet switching include determining a schedule for transceivers in an enclosure. The schedule specifies which of the transceivers will act as a transmitter and which will act as a receiver. A beamforming direction for transmitting data from each transmitter to each corresponding receiver is determined. It is determined that an angle of the beamforming direction for at least one transmitter is lower than a minimum angle. Data is transmitted from a transmitter to the corresponding receiver by a wired connection, responsive to the determination that the angle of the beamforming direction is lower than a minimum angle.

20 Claims, 4 Drawing Sheets

(51) Int. Cl.
  *H04W 16/28* (2009.01)
  *H04L 12/933* (2013.01)
  *H04L 12/937* (2013.01)
  *H04L 12/863* (2013.01)
(52) U.S. Cl.
  CPC .......... *H04L 49/101* (2013.01); *H04L 49/254* (2013.01); *H04W 16/28* (2013.01)

(56) References Cited

U.S. PATENT DOCUMENTS

| | | | |
|---|---|---|---|
| 6,629,147 | B1 | 9/2003 | Grow |
| 7,023,833 | B1 | 4/2006 | Aiello et al. |
| 7,539,175 | B2 | 5/2009 | White et al. |
| 7,929,474 | B2 | 4/2011 | Pettus et al. |
| 8,848,676 | B1 | 9/2014 | Wheeler et al. |
| 9,239,578 | B2 | 1/2016 | Ziarno |
| 2002/0068590 | A1 | 6/2002 | Suzuki et al. |
| 2002/0149534 | A1 | 10/2002 | Bobier |
| 2003/0052828 | A1 | 3/2003 | Scherzer et al. |
| 2005/0047322 | A1* | 3/2005 | Sondur ............ H04B 7/0697 370/203 |
| 2006/0114158 | A1 | 6/2006 | Chiang et al. |
| 2006/0268816 | A1 | 11/2006 | Adachi et al. |
| 2007/0129018 | A1* | 6/2007 | Trainin ............ H04L 1/0026 455/69 |
| 2007/0172235 | A1 | 7/2007 | Snider et al. |
| 2008/0225991 | A1 | 9/2008 | Proctor et al. |
| 2008/0267151 | A1 | 10/2008 | Hartenstein |
| 2010/0172292 | A1 | 7/2010 | Ramachandran et al. |
| 2010/0239266 | A1 | 9/2010 | Kash et al. |
| 2010/0278538 | A1 | 11/2010 | Guidotti et al. |
| 2011/0064033 | A1 | 3/2011 | Gong et al. |
| 2011/0087799 | A1 | 4/2011 | Padhye et al. |
| 2011/0150496 | A1 | 6/2011 | Davidson et al. |
| 2011/0183617 | A1 | 7/2011 | Davidson et al. |
| 2011/0243074 | A1 | 10/2011 | Shin et al. |
| 2012/0171972 | A1 | 7/2012 | Huang et al. |
| 2012/0320874 | A1 | 12/2012 | Li et al. |
| 2012/0329473 | A1* | 12/2012 | Ekbatani ............ H04W 76/14 455/456.1 |
| 2015/0105025 | A1* | 4/2015 | Zhang ............ H04B 7/063 455/63.4 |
| 2015/0230102 | A1* | 8/2015 | Kang ............ H04B 7/0689 455/450 |
| 2019/0028564 | A1* | 1/2019 | Singamsetty ......... H04L 63/205 |

OTHER PUBLICATIONS

Cui, Y., et al. "Channel Allocation in Wireless Data Center Networks" 30th IEEE International Conference on Computer Communications, Joint Conference of the IEEE Computer and Communications Societies. Apr. 2011. 9 Pages.

Cui, Y., et al. "Wireless Link Scheduling for Data Center Networks" Proceedings of the 5th International Conference on Ubiquitous Information Management and Communication, ICUIMC 2011. Feb. 2011. 9 Pages.

Kandula, S., et al. "Flyways to De-Congest Data Center Networks". Eight ACM Workshop on Hot Topics in Networks (HotNets-VIII), HOTNETS '09. Oct. 2009. pp. 1-6.

Jia, Z. "Optical Millimeter-Wave Signal Generation, Transmission and Processing for Symmetric Super-Broadband Optical-Wireless Access Networks". Georgia Institute of Technology. Aug. 2008. 51 Pages.

Katayama, Y., et al. "Wireless Data Center Networking with Steered-Beam mmWave Links". 2011 IEEE Wireless Communications and Networking Conference, WCNC 2011. Mar. 2011. 6 Pages.

Lin, Y., et al. "Wireless network cloud: Architecture and system requirements" IBM Journal of Research and Development. vol. 54 Issue 1. Jan. 2010. 12 Pages.

Ramachandran, K., et al. "60 GHZ Data-Center Networking: Wireless —> Worry Less?" NEC Technical Report, Jul. 2008. pp. 1-11.

Shin, J., et al. "On the Feasibility of Completely Wireless Data Centers" IEEE/ACM Trans. Netw. 21. (vol. 21, Issue: 5. Oct. 2013. p. 1666-1679.

Vardhan, H., et al. "Wireless Data Center with Millimeter Wave Network" Proceedings of the Global Communications Conference, 2010. Dec. 2010. 6 Pages.

Zhang, W. et al. "3D Beamforming for Wireless Data Centers" Tenth ACM Workshop on Hot Topics in Networks (HotNets-X), Hotnets '11. Nov. 2011. pp. 1-6.

International Search Report and Written Opinion issued by the Japan Patent Office and dated Jun. 16, 2015 in International Application No. PCT/IB2015/051975.

Lichun Bao, Transmission Scheduling in Ad Hoc Networks with Directional Antennas, MOBICOM '02, Atlanta GA, Sep. 23-28, 2002.

Xia Zhou, Mirror Mirror on the Ceiling: Flexible Wireless Links for Data Centers, SIGCOMM '12, Helsinki Finland, Aug. 13-17, 2012.

Office Action for U.S. Appl. No. 15/160,640 dated Apr. 20, 2017 (23 pages).

Office Action issued in U.S. Appl. No. 15/160,640 dated Oct. 6, 2017, pp. 1-9.

Non Final Rejection for U.S. Appl. No. 15/926,065 dated May 30, 2019 (29 pages).

Non-Final Office Action issued in U.S. Appl. No. 15/684,225 dated Oct. 21, 2019, pp. 1-16.

Final Rejection for U.S. Appl. No. 15/926,065 dated Nov. 15, 2019 (17 pages).

* cited by examiner

WIRELESS CROSS-CONNECT SWITCH

BACKGROUND

Technical Field

The present invention relates to network communications and, more particularly, to wireless cross-connect switches for network clusters and data centers.

Description of the Related Art

Data centers show increased usage of large-bandwidth communication systems due to heightened server and storage consolidation, increased virtualization of system resources, and the design of multi-core processor and multi-processor systems. The demand for interconnection performance increases proportionally with processor performance, as faster processors need correspondingly faster input/output connections. However, interconnection technology scales at a much slower rate than processor speed, resulting in an interconnect bottleneck. Conventionally this is solved by increasing the number of communication links, but such a solution causes problems of its own in data center management, as the number of cables for wired connections can rapidly become unmanageable.

In wired data centers, each server rack is connected to a network fabric of aggregation switches and core routers. There may be dozens of cables between each rack and the switch/router fabric. The core router may have hundreds or thousands of ports and is generally not reconfigurable. In addition, such core routers are often expensive and power hungry. The hundreds of cables passing to this single machine may impair data center cooling and occupy a substantial amount of space and data center infrastructure. While cables can be run along a drop ceiling to conserve space, the weight of the cabling often requires structural reinforcement to prevent the data center's ceiling from collapsing.

The problem is even more pronounced in all-to-all clusters. Some applications work best on clusters where every node is directly connected to all other nodes. In an exemplary cluster having 32 nodes, where each node needs to connect to 31 others, a total of 496 cables are needed. In a cluster of 128 processors, 8128 cables are needed. This places a large burden on the data support, logistically, economically, and structurally.

SUMMARY

A method for wireless packet switching include determining a schedule for transceivers in an enclosure. The schedule specifies which of the transceivers will act as a transmitter and which will act as a receiver. A beamforming direction for transmitting data from each transmitter to each corresponding receiver is determined. It is determined that an angle of the beamforming direction for at least one transmitter is lower than a minimum angle. Data is transmitted from a transmitter to the corresponding receiver by a wired connection, responsive to the determination that the angle of the beamforming direction is lower than a minimum angle.

A system for wireless packet switching includes transceivers in an enclosure. An arbiter is configured to determine a schedule for the plurality of transceivers, wherein the schedule specifies which of the plurality of transceivers will act as a transmitter and which will act as a receiver. Each transmitter transmits data to a corresponding receiver by a wired connection if an angle of a beamforming direction from the transmitter to the corresponding receiver is lower than a minimum angle.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide wireless cross-connect switches that employ beamforming and beamsteering to create a flexible and scalable interconnect system for server clusters and data centers. Two such switches are provided for herein: an inter-rack switch that provides switched wireless communication between individual racks, and an intra-rack switch that provides communication between devices within a single rack.

The present embodiments are disclosed as using, e.g., millimeter-wave (mmWave) transmissions, for example at 60 GHz or 120 GHz mmWave communications have high rates of absorption in many materials and attenuate quickly, such that it is difficult or impossible to eavesdrop on mmWave communications without being in the line of sight. Using fine-beam antenna arrays with beamsteering, communications can be made secure and interference between transceivers can be minimized. mmWave communications also allow high data rates, such that mmWave communications can be compatibly used with fiber and copper interconnects in hybrid systems. The wireless cross-connect switches described below provide for static and dynamic switching for packet switched protocols and many be used for multicast, broadcast, and anycast addressing.

Although mmWave communications are therefore specifically contemplated herein, it should be recognized that other forms of wireless communication may be employed as an alternative. Due to the high carrier frequency, there is considerable bandwidth available in mmWave, so that even simple modulation schemes that can be implemented at very low power can be used to carry high data rate signals. Since the antennas become very small at the high frequencies, the transmitters and receivers are compact and can be built into dense arrays. In addition, techniques to steer beams electronically can be used in conjunction with redundancy to improve system-level reliability. Spatial multiplexing inherent to fan-beam antennas allows co-existence and smart re-use of the frequency spectrum in more efficient way then traditional frequency division multiplexing systems.

Figure 1:
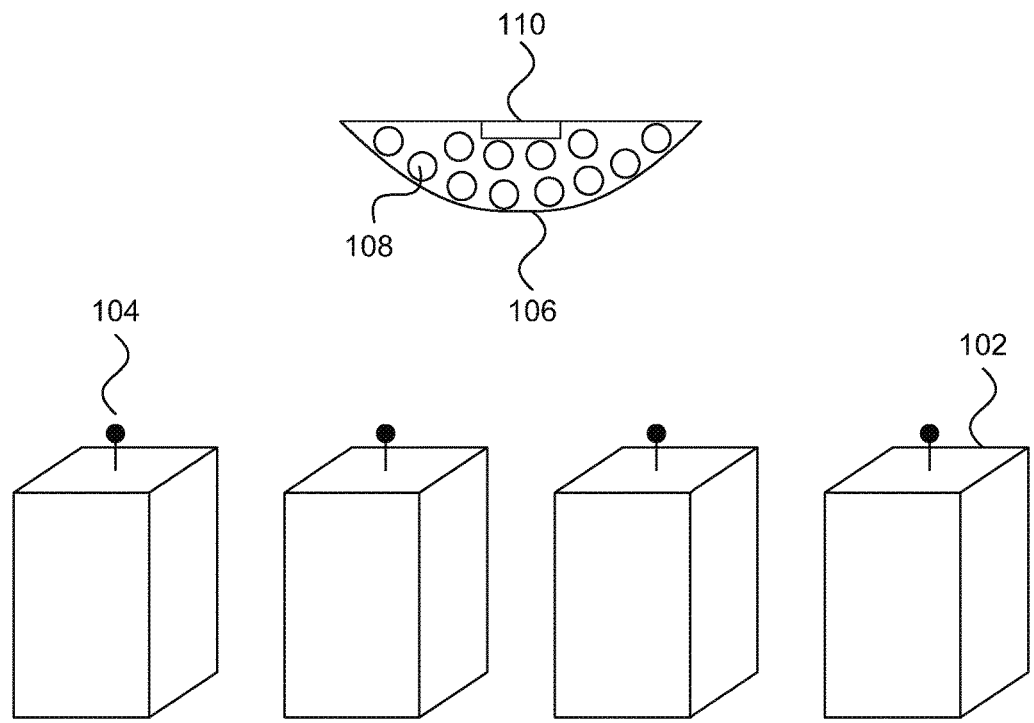
FIG. 1 is a diagram of a wireless network in accordance with the present principles.

Referring now to the drawings in which like numerals represent the same or similar elements and initially to FIG. 1, an exemplary data center using wireless switching is shown. The data center includes a set of racks 102, each of which may have one or more connected devices such as servers. Each rack 102 has an mmWave transceiver 104 mounted on or in a top surface. On the ceiling of the data center is mounted an electronic crosspoint switch 106 that includes a set of antennas 108 and an arbiter 110.

The switch 106 is contemplated as having a hemispherical or otherwise curved surface, with the antennas 108 being conformal antennas on the surface of the switch 106 or on respective hemispherical protrusions. This geometry provides line-of-sight access to a greater number of racks 102. The short wavelengths of mmWave communications allow very small antennas to be used, whereas antennas for longer wavelengths would be more difficult to implement conformally.

The transceivers 104 form mmWave radio links to and from the arbiter device 110 through the antennas 108. The antennas 108 are connected within the switch 106 using wirelines, including, e.g., copper or fiber cables. Each antenna 108 may represent a beamforming antenna array that may provide directional three-dimensional beamsteering directly to a specific transceiver 104. The arbiter 110 performs scheduling, evaluating requests from different inputs and providing grants to specific antenna/transceiver combinations. The arbiter 110 controls the antennas 108 to specify beam directions and, in doing so, can flexibly reconfigure the switch 106 as needed.

The switch 106 may further function as an aggregator, collecting and multiplexing communications from the racks 102 for transmission to other clusters. In such a system, there may be other switches 106 serving other racks 102 in the data center, and communication between these clusters may be managed by a core router located, for example, in the ceiling. Communications between the switches 106 and the core router may be accomplished through fiber, coaxial, or wireless interconnects.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 2:
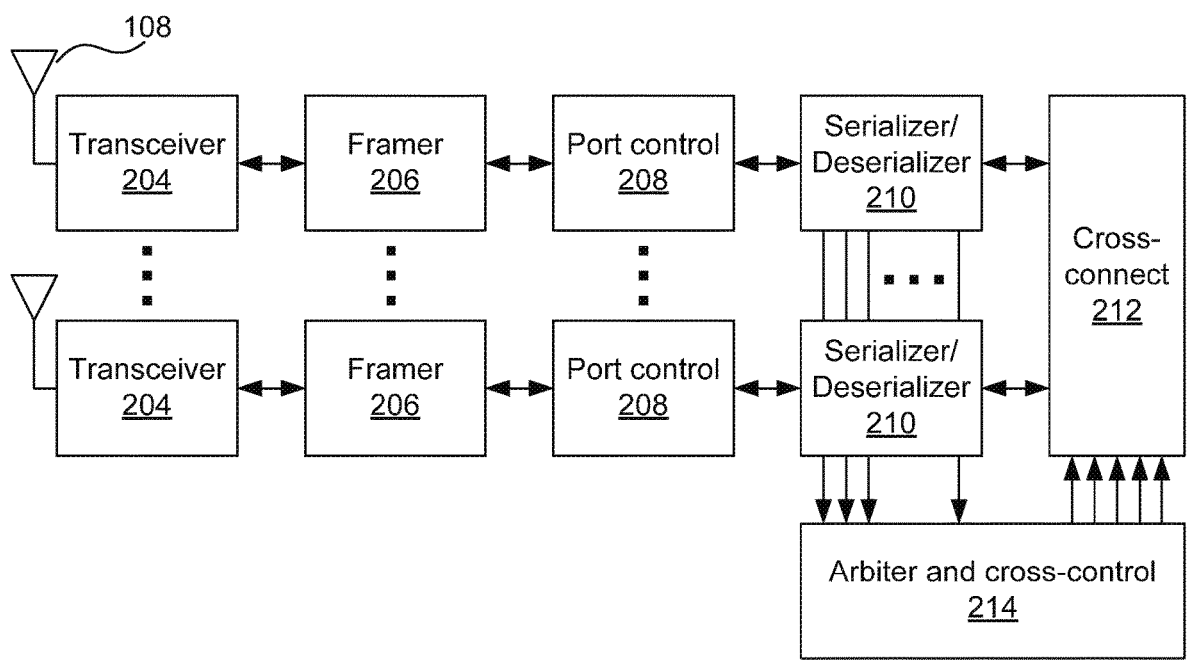
FIG. 2 is a block diagram of a wireless cross-connect switch in accordance with the present principles.

Referring now to FIG. 2, a block diagram of the switch 106 is shown. A set of antennas 108 connect to respective transceivers 204 which are tuned to receive and transmit mmWave communications. A framer 206 inserts and extracts characters to indicate the start of header and end of transmission portions of packets. A port controller 208 processes framed data that is multiplexed/demultiplexed in serializer/deserializer 210. A cross-connect 212 forms connections between paths that receive a signal to paths that transmit a signal, thereby allowing signals from any arbitrary antenna 108 to be retransmitted on any arbitrary second antenna 108. The cross-connect 212 may be cascaded to provide switching for larger configurations. For example, sixteen 64×64 cross-bar modules can be connected to form a 256×256 cross-bar. An arbiter and cross control module 214 receives information from the serializer/deserializers 210 and controls the cross-connect 212 accordingly. The arbiter 214 may furthermore be in communication with the arbiters of other switches 106, connected wirelessly or by a wired connection to a core router.

The arbiter 214 controls data flow between the inputs and the outputs of the cross-connect switch 212. The arbiter 214 looks at the segmented data from port controller and evaluates requests from different inputs. The requests of different inputs include a specific address of a communicated device located in a different server. The arbiter 214 then evaluates the priority, provides grants, and reconfigures the switch 212 to allow routing of the packet to the right server and communication device.

The port control 208 is a network processor that is used for the policing and scheduling of data. The policy of the port controller 208 can change from time to time and can be a function of different networking scenarios or changes in the network. For example, although a given channel may need to communicate with some servers, it may be prevented from doing so because a policy has changed. Scheduling includes timing information and a list of addresses a specific packet should be sent to.

The serializer/deserializer 210 multiplexes and demultiplexes both the data as well as control information. Fast synchronization is possible after switch reconfiguration using data clock recovery after reconfiguring the cross-connect switch 212. Such synchronization includes the alignment of frames received from port controllers 208. Alignment of frames received from the port controllers 208 uses small first-in-first-out buffers to ensure frame synchronization.

The arbiter and cross-control 214 includes a tag evaluation module that provides requests for reconfiguration. A tag is a portion of the incoming data that includes a packet address and some measure of priority related to a packet, allowing the arbiter 214 to determine where the packet should go and how quickly it needs to go there.

On the physical layer, the arbiter and cross-control 214 may extract the tags, or headers, based on precise timing information. For example, after receiving an open header, the next m bits may refer to the type/protocol, followed by n bits that refer to the source address, followed by p bits that refer to the destination address, and so on. This information is then communicated to the port controllers 208 to configure the connection based on a given routing policy.

Arbitration depends largely on the routing policy (e.g., source routing, in which case the entire path of a packet is precomputed by the source node and is stored, for example, in a lookup table). In the simplest case, when there is no conflict, input and output transceivers 204 are configured by the arbiter 214, which matches free network resources with the packets that request those resources. If there is a conflict (e.g. packets from two or more input ports that simultaneously request the same output port), then the arbiter 214 resolves the conflict (for example, based on priority tags, or by round-robin allocation, or by dropping packets if permitted).

Figure 3:
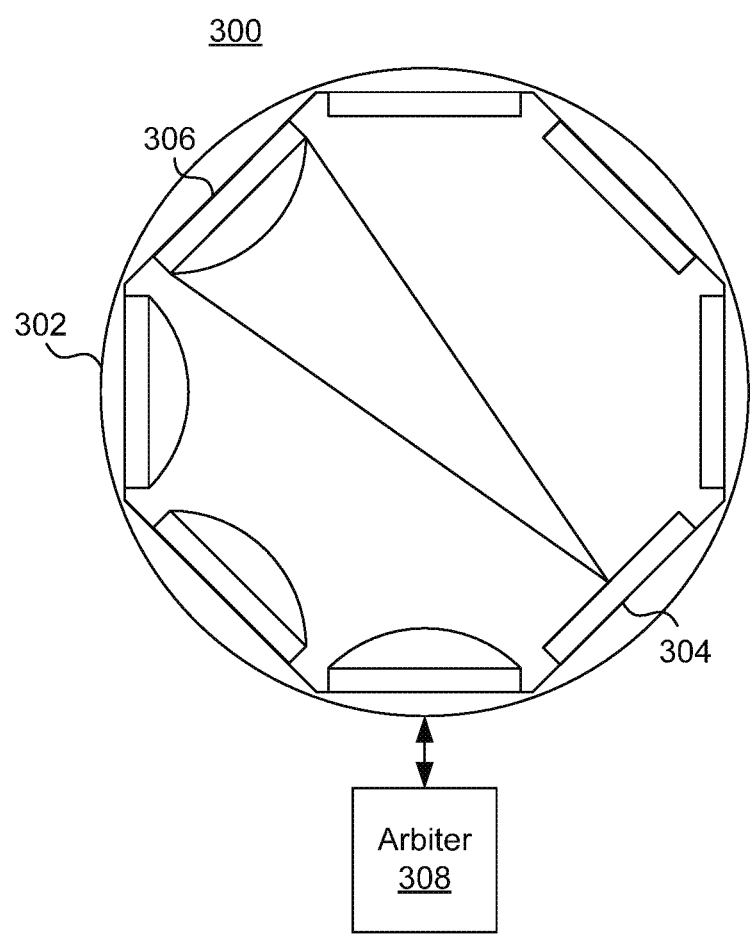
FIG. 3 is a diagram of a wireless cross-connect enclosure in accordance with the present principles.

Referring now to FIG. 3, a wireless intra-rack switch 300 is shown. The switch 300 occupies a cylindrical Faraday cage 302 and includes directional transmitters 304 and omni-directional receivers 306. FIG. 3 shows a single cross-section of the switch 300, and it should be understood that multiple such cross-sections may be stacked to increase the switch's capacity. The transmitters 304 employ beam forming to direct transmissions to specific receivers 306 and may operate at, for example, mmWave frequencies. The Faraday cage 302 prevents transmissions from leaking out of the switch 300, thereby preventing eavesdropping and enhancing security. Although it is specifically contemplated that the Faraday cage 302 is formed from a conductive material, the cage 302 may be replaced with a layer of material that is absorptive to mmWave frequencies, such as foam. The individual transmitters 304 and receivers 306 may furthermore be connected to an arbiter 308 via a wireless connection or by a wired interconnect.

It should be noted that each of the transmitters 304 and receivers 306 may actually be part of a bi-directional communication structure. The transmitter 304 and receiver 306 may alternate sending and receiving roles. The arbiter 308 controls each of the devices and coordinates which devices will act as transmitters 304 and which will act as receivers 306 for a given transmission period. This may be reorganized periodically or as needed.

Although the switch in FIG. 3 is shown as having eight transmitters/receivers, the number of different devices may be increased, limited only by how small a beam angle the transmitters 304 can produce. Practical values for one embodiment may be, e.g., 5-10°. The switch 300 may furthermore be used in a broadcast mode, where a single transmitter 304 transmits to all receivers 306. In this case, the transmitters 304 are omni-directional as well as the receivers 306. Multicast is also possible, where one transmitter 304 communicates with a group of receivers 306. This may be accomplished by connecting with a single receiver 306 and having that receiver 306 share the data with its neighbors via a wired connection. Such a wired connection provides for communication between devices that may be too close to one another to be reached by beamforming.

In addition to the infrastructural applications shown above for data centers, other applications are envisioned. For example, wirelessly switched memory may use a wireless switch 300 as shown above to facilitate communication between a processor cluster and a memory cluster, with dynamic processing of the memory as called for by the workload. Memory and processing nodes can be separated by a substantial distance (e.g., 10 m), allowing a first processor to access memory blocks from another processor.

Figure 4:
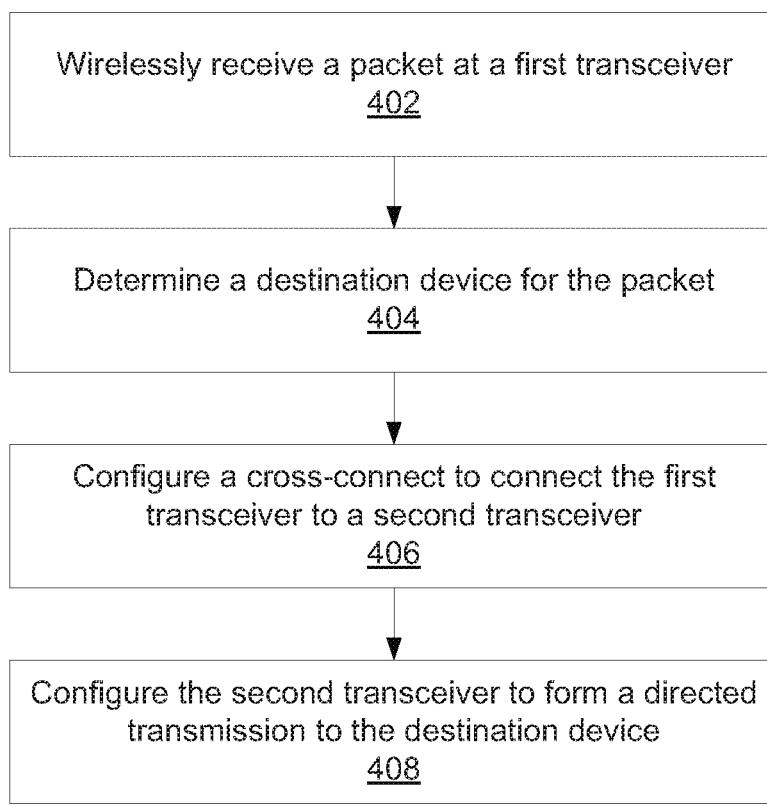
FIG. 4 is a block/flow diagram of a method for operating a wireless cross-connect switch in accordance with the present principles.

Referring now to FIG. 4, a method for operating a wireless cross-connect switch 106 is shown. Block 402 receives a packet from a first device at a first transceiver 204 with an antenna 202. The first transceiver 204 is configured to communicate with the first device using a directional beam to minimize interference from other devices. A port controller 208 analyzes the packet and communicated with the arbiter 214 to determine a destination device for the packet at block 404. At block 406 the arbiter 214 controls a cross-connect 212 to connect the packet to a second transceiver that can reach the destination device. Block 408 configures an antenna 202 of the second transceiver 204 to form a beam directed at the destination device to allow transmission of the packet.

Figure 5:
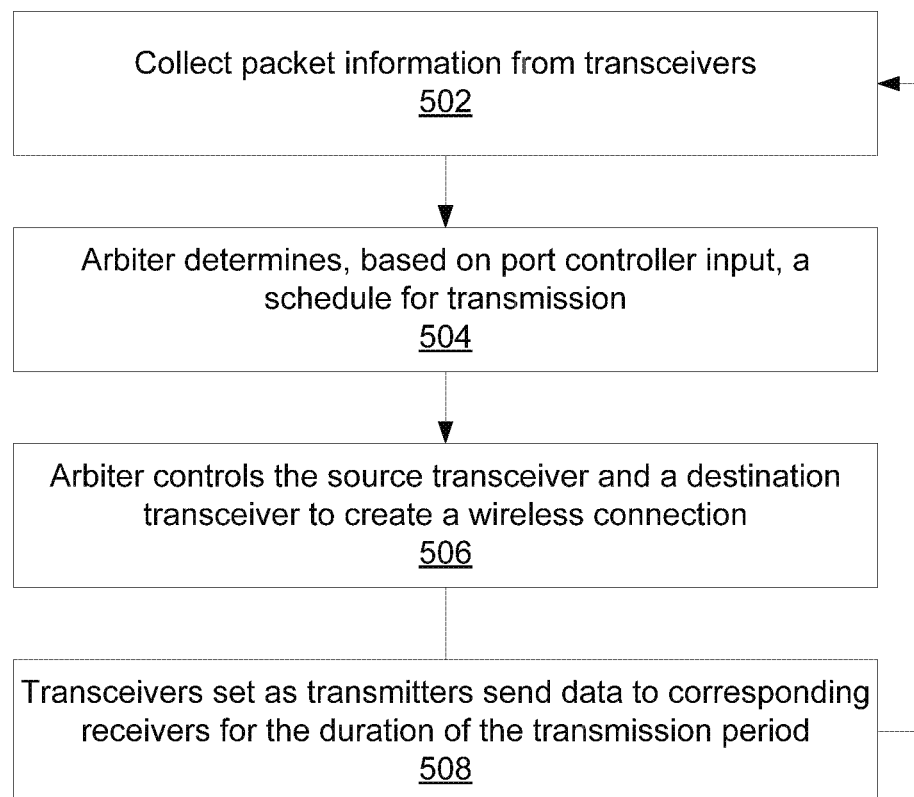
FIG. 5 is a block/flow diagram of a method for operating a wireless cross-connect enclosure in accordance with the present principles.

Referring now to FIG. 5, a method for operating a wireless switching enclosure 300 is shown. At block 502, an arbiter 308 collects information from one or more first transceivers 304 that they have information to communicate to one or more corresponding second transceiver 306 in the enclosure 300. The arbiter 308 determines a schedule of transmissions in accordance with information provided by the port controller in block 504. The schedule includes designations for the transceivers to determine which transceivers will operate as transmitters 304 and which will operate as receivers 306 for the duration of a transmission period. The transmission period may be a predetermined length of time or may be responsive to network conditions by, e.g., ending when a queue reaches a threshold number of packets that cannot be transmitted to their destination in the current schedule.

The arbiter 308 then controls the first transceiver 304 and the second transceiver 306 to coordinate the transmission in block 506, such that the first transceiver 304 emits a directed beam to the second transceiver 306 operating as a receiver. The beam may be directed to a receiver 306 that is vertically as well as radially displaced from the transmitter 304. The receiver 306 may also be configured according to some beamforming direction or may simply be configured to receive omnidirectionally.

Block 508 transmits packets from transmitters 304 to their corresponding receivers 306 until the end of the transmission period. At this point, processing returns to block 502 to determine a new schedule according current network conditions and switching needs.

Having described preferred embodiments of a wireless cross-connect switch methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for wireless packet switching, comprising:
determining a schedule for a plurality of transceivers in an enclosure, wherein the schedule specifies which of the plurality of transceivers will act as a transmitter and which will act as a receiver;
determining a beamforming direction for transmitting data from each transmitter to each corresponding receiver;
determining that an angle of the beamforming direction for at least one transmitter is lower than a minimum angle; and
transmitting data from a transmitter to the corresponding receiver by a wired connection, responsive to the determination that the angle of the beamforming direction is lower than a minimum angle.

2. The method of claim 1, further comprising repeating said steps of determining and transmitting data for subsequent transmission periods.

3. The method of claim 2, wherein each transmission period ends when a transmission queue accumulates a threshold number of packets that cannot reach a specified destination under the determined schedule.

4. The method of claim 1, wherein the plurality of transceivers are inwardly facing within the enclosure.

5. The method of claim 1, wherein the plurality of transceivers are arranged in a plurality of vertically arranged rings.

6. The method of claim 5, wherein the beamforming direction selects a radial direction and a vertical direction.

7. The method of claim 1, wherein determining the schedule comprises analyzing packets queued by the computing devices to determine destination devices.

8. The method of claim 1, wherein one or more transmitters are configured with a beamforming pattern that is directed to multiple receivers.

9. The method of claim 1, wherein the minimum angle is 10°.

10. A system for wireless packet switching, comprising:
a plurality of transceivers in an enclosure; and
an arbiter configured to determine a schedule for the plurality of transceivers, wherein the schedule specifies which of the plurality of transceivers will act as a transmitter and which will act as a receiver, wherein each transmitter transmits data to a corresponding receiver by a wired connection if an angle of a beamforming direction from the transmitter to the corresponding receiver is lower than a minimum angle.

11. The system of claim 10, wherein the plurality of transceivers and the arbiter are further configured to repeat said steps of determining and transmitting data for subsequent transmission periods.

12. The system of claim 11, wherein each transmission period ends when a transmission queue accumulates a threshold number of packets that cannot reach a specified destination under the determined schedule.

13. The system of claim 10, wherein the plurality of transceivers are inwardly facing within the enclosure.

14. The system of claim 10, wherein the plurality of transceivers are arranged in a plurality of vertically arranged rings.

15. The system of claim 14, wherein the beamforming direction selects a radial direction and a vertical direction.

16. The system of claim 10, wherein the arbiter is further configured to analyze packets queued by the computing devices to determine destination devices.

17. The system of claim 10, wherein one or more transmitters are configured with a beamforming pattern that is directed to multiple receivers.

18. The system of claim 10, wherein the arbiter is further configured to determine a beamforming direction for transmitting data from each transmitter to each corresponding receiver.

19. The system of claim 10, further comprising wired connections between neighboring transceivers in the plurality of transceivers.

20. The system of claim 10, wherein the minimum angle is 10°.

* * * * *